No. 610,010. Patented Aug. 30, 1898.
R. G. WINTER.
SEPARABLE SUSPENSION HINGE.
(Application filed May 10, 1898.)
(No Model.) 2 Sheets—Sheet 1.
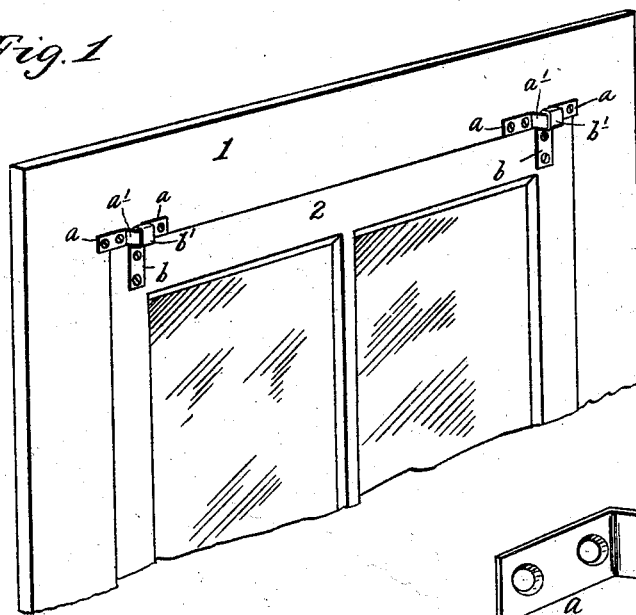
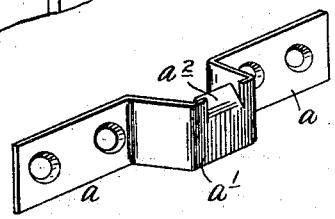
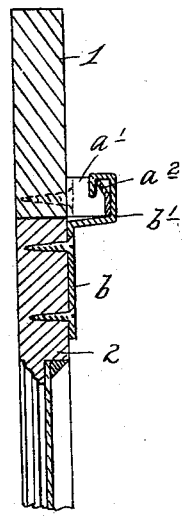
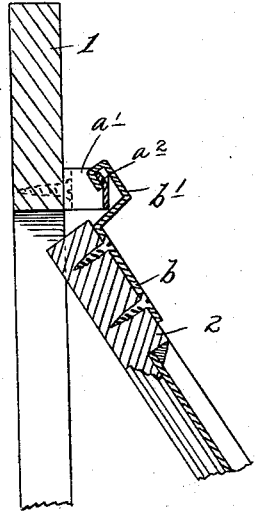
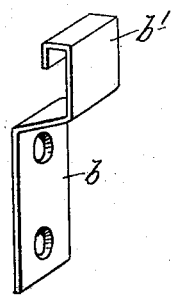
Witnesses
C. F. Kilgore
Harry Kilgore
Inventor
Rudolph G. Winter
By his Attorney
Jas. F. Williams
THE NORRIS PETERS CO., PHOTO-LITHO., WASHINGTON, D. C.

No. 610,010. Patented Aug. 30, 1898.
R. G. WINTER.
SEPARABLE SUSPENSION HINGE.
(Application filed May 10, 1898.)
(No Model.) 2 Sheets—Sheet 2.
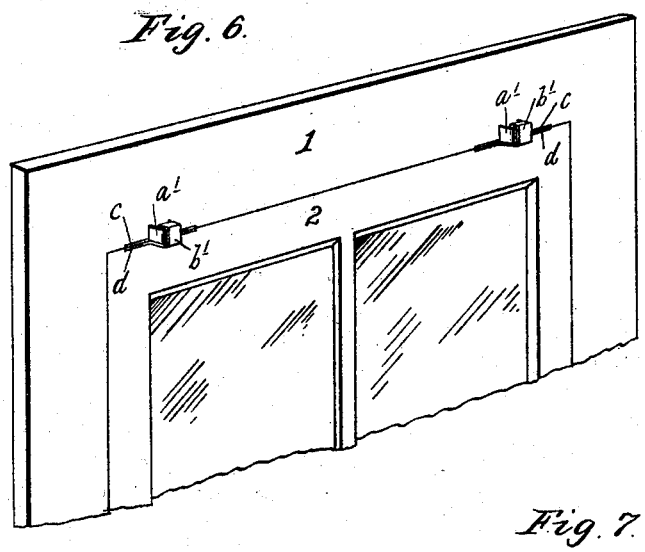
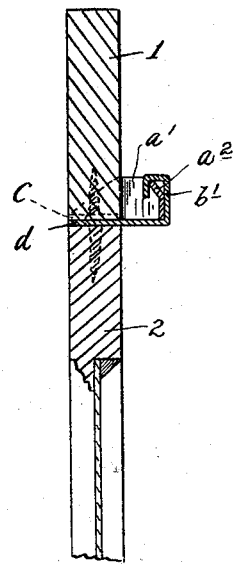
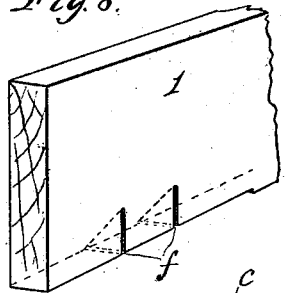
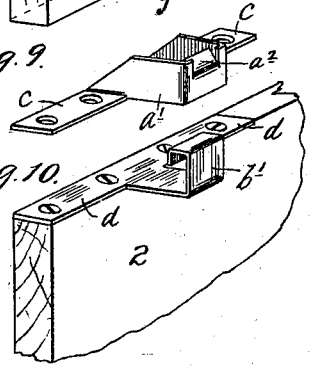
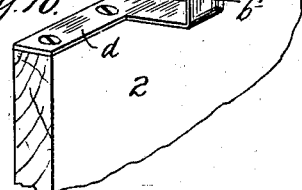
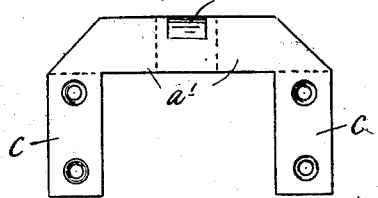
Witnesses
C. F. Kilgore
Harry Kilgore
Inventor
Rudolph G. Winter
By his Attorney
Jas. F. Williams
THE NORRIS PETERS CO., PHOTO-LITHO., WASHINGTON, D. C.

United States Patent Office.

RUDOLPH G. WINTER, OF MINNEAPOLIS, MINNESOTA.

SEPARABLE SUSPENSION-HINGE.

SPECIFICATION forming part of Letters Patent No. 610,010, dated August 30, 1898.

Application filed May 10, 1898. Serial No. 680,256. (No model.)

*To all whom it may concern:*

Be it known that I, RUDOLPH G. WINTER, a citizen of the United States, residing at Minneapolis, in the county of Hennepin and State of Minnesota, have invented certain new and useful Improvements in Separable Suspension-Hinges; and I do hereby declare the following to be a full, clear, and exact description of the invention, such as will enable others skilled in the art to which it appertains to make and use the same.

My invention relates to separable hinges, and has for its object to provide an improved hinge of this class.

The invention was especially designed to meet the requirements of storm-windows, transoms, and other suspended bodies which it is desired to separably connect to a fixed body by a hinge.

To this end my invention consists of the novel devices and combinations of devices, which will be hereinafter described, and defined in the claims.

The invention is illustrated in the accompanying drawings, wherein, like notations referring to like parts throughout the several views—

Figure 1 is a perspective view with some parts broken away, illustrating one form of my improved hinge as applied for supporting a storm-window, transom, or other device. Fig. 2 is a perspective view of the fixed member of the hinge-plates. Fig. 3 is a similar view of the detachable member of the hinge-plates. Fig. 4 is a vertical section through the hinge and the parts connected thereby when the hinge-plates are in their closed position. Fig. 5 is a similar view of the same parts in their open position. Fig. 6 is a view similar to Fig. 1, showing a modified form of hinge. Fig. 7 is a vertical section through the hinge-plates and the parts carried thereby in their closed position as shown in Fig. 6. Fig. 8 is a detail in perspective, showing part of the casing or fixed structure to which the hinge is applied. Fig. 9 is a similar view showing the upper or fixed member of the hinge-plates. Fig. 10 is a similar view showing the lower or pivoted and detachable member of the hinge-plates and a part of the storm-window or other body carried thereby. Fig. 11 is a plan view of the metal blank, which may be bent into the form shown in Fig. 9.

The upper member of the suspension-hinge is of the proper shape to afford attaching-wings $a$ and an outwardly-offset vertical holder $a'$, which is approximately of rectangular form in cross-section. The outer vertical wall of the offset holder $a'$ is substantially parallel with the wings $a$ and is slit from its top downward, with the separated portion turned inward to afford a lug $a^2$, which operates as will be later noted. The lower or depending member of the hinge is of the proper form to afford a foot or attaching portion $b$ and an outwardly-offset hook portion $b'$, which is of approximately rectangular form in cross-section. When the two members of the hinge are brought into working relation by engaging the hook end of the lower member over the holder of the upper member, the downturned lip of the hook on the lower member will over and under reach the inturned lug or tongue $a^2$ of the holder on the upper member and the vertical walls of the holder and of the hook will interlock with each other, thereby preventing any lateral motion of the two hinge members in respect to each other, keeping the same from separating under their opening motion, and limiting the opening motion by the coöperation of the lip on the hook and the lug $a^2$ on the holder. The upper member of the hinge is of course applied in a horizontal position to the window-casing 1 or other fixed structure, and the lower member is applied to the window or other body carried thereby, with its hook portion in a vertical position.

In the instance illustrated in Figs. 1 to 5, inclusive, the hinge members are of the proper form for applying their attaching portions to the outside vertical surfaces of the bodies connected thereby. For example, the two upper hinge members are screwed fast to the window-casing 1, on the face thereof, and the lower hinge members are screwed fast to the face of the window-frame 2. With this form of hinge (shown in Figs. 1 to 5) the parts when in their closed position will appear as shown in Figs. 1 and 4, and when in their open position the parts will appear as shown in Fig. 5. It is of course obvious that the storm-window or other body carried by the lower hinge members may be readily detached at will from the upper hinge members, which are fixed once for all to the permanent structure.

In the form of hinge illustrated in Figs. 6 to 11, inclusive, the holder on the upper hinge member and the hook on the lower hinge member are the same in construction and in action as in the form illustrated in Figs. 1 to 5, inclusive, but the attaching-wings for the respective hinge members are differently disposed, so as to adapt the same to be secured to the bodies 1 and 2 in a horizontal position. For example, the wings $c$ for the upper hinge member project in a horizontal direction from the inner lower edges of the vertical holder $a'$, and the wings $d$ for the lower hinge member extend in a horizontal direction from the inner end of the horizontal part of the hook $b'$. Hence with this construction (illustrated in Figs. 6 to 11) the upper hinge member may be secured to the under edge of the cap portion of the casing 1, the latter being sawkerfed, as shown at $f$, to afford seats for the inner ends of the vertical walls of the holder $a'$, and the lower hinge member is screwed fast directly to the top of the window-frame 2 or other object intended to be carried thereby. When the parts are together and in their closed position, they will appear as shown in Figs. 6 and 7.

In both forms it will be seen that the pivoted body 2 is suspended in such a way that when the pivoted body is in its closed position its outside surface or face will be flush with the outside surface or face of the fixed body 1. Otherwise stated, the gist of the construction in each form of the hinge is the outwardly-offset holder $a'$ on the upper hinge member, of approximately rectangular form in cross-section and having the inturned tongue or lug $a^2$, and the offset hook on the lower member, also of substantially rectangular form in cross-section, for coöperation with the outwardly-offset holder of the upper hinge member. Whether the wings be applied to the said parts in such a way as to adapt the hinge members to be made fast to the vertical faces of the bodies connected thereby or to horizontal surfaces thereof is a matter of choice.

From the foregoing statement it will be seen that by the construction described I have provided a separable suspension-hinge of extremely simple and cheap construction. I prefer to make the hinge members by stamping the same up from sheet metal, as shown, but of course they might be otherwise formed. A hinge of this sort is especially well adapted for storm-windows, transoms, screens, blinds, and other bodies which it is desired to detachably suspend with freedom for a limited outward pivotal movement.

What I claim, and desire to secure by Letters Patent of the United States, is as follows:

1. A separable suspension-hinge, the upper member of which has an outwardly-offset vertical holder approximately of rectangular form in cross-section, and the lower member of which has at its upper end a vertical hook outwardly offset and approximately of rectangular form in cross-section, whereby when the said holder and the said hook are engaged with each other they will interlock against lateral motion but permit a limited pivotal motion, substantially as described.

2. A separable suspension-hinge, the upper member of which has an outwardly-offset vertical holder of approximately rectangular form in cross-section, and is provided with a lug or tongue projecting inward from the outer wall of said holder, and the lower member of which hinge has an outwardly-offset vertical hook of approximately rectangular form in cross-section, the downturned lip of which hook coöperates with said holder-lug, as a stop to limit the pivotal motion, substantially as described.

In testimony whereof I affix my signature in presence of two witnesses.

RUDOLPH G. WINTER.

Witnesses:
 JAS. F. WILLIAMSON,
 BESSIE B. NELSON.